US010962083B2

(12) United States Patent
Nakamaru et al.

(10) Patent No.: US 10,962,083 B2
(45) Date of Patent: Mar. 30, 2021

(54) VIBRATION-DAMPING DEVICE

(71) Applicant: YAMASHITA RUBBER CO., LTD., Fujimino (JP)

(72) Inventors: Yuichi Nakamaru, Saitama (JP); Hiroki Kashihara, Saitama (JP)

(73) Assignee: YAMASHITA RUBBER CO., LTD., Fujimino (JP)

( * ) Notice: Subject to any disclaimer, the term of this patent is extended or adjusted under 35 U.S.C. 154(b) by 13 days.

(21) Appl. No.: 16/340,888

(22) PCT Filed: Oct. 12, 2017

(86) PCT No.: PCT/JP2017/037092
§ 371 (c)(1),
(2) Date: Apr. 10, 2019

(87) PCT Pub. No.: WO2018/070505
PCT Pub. Date: Apr. 19, 2018

(65) Prior Publication Data
US 2019/0234483 A1    Aug. 1, 2019

(30) Foreign Application Priority Data

Oct. 12, 2016   (JP) .............................. JP2016-201039

(51) Int. Cl.
*F16F 15/08*    (2006.01)
*F16F 1/38*     (2006.01)

(52) U.S. Cl.
CPC ............... *F16F 15/08* (2013.01); *F16F 1/38* (2013.01); *F16F 1/3842* (2013.01); *F16F 1/3863* (2013.01)

(58) Field of Classification Search
CPC .. F16F 15/08; F16F 1/38; F16F 1/3824; F16F 1/3863; F16F 1/3828; F16F 1/3732; B60G 2204/41
See application file for complete search history.

(56) References Cited

U.S. PATENT DOCUMENTS

| 4,767,108 A | * | 8/1988 | Tanaka | B60G 7/00 267/140.12 |
| 6,666,438 B2 | * | 12/2003 | Nakagawa | F16F 1/3814 267/140.12 |
| 7,104,533 B2 | * | 9/2006 | Kato | F16F 1/3842 267/140.12 |

(Continued)

FOREIGN PATENT DOCUMENTS

| JP | 2001193776 A | * | 7/2001 |
| JP | 2002-161934 | | 6/2002 |

(Continued)

OTHER PUBLICATIONS

International Search Report, dated Dec. 19, 2017 (dated Dec. 19, 2017), 1 page.

*Primary Examiner* — Melanie Torres Williams
(74) *Attorney, Agent, or Firm* — Rankin, Hill & Clark LLP

(57) ABSTRACT

An object of the present invention is to provide a vibration-damping device which inhibits a flange part and an outer cylinder from breaking. The vibration-damping device includes: an inner cylinder; a resin-made outer cylinder arranged outside the inner cylinder in a radial direction; and a rubber elastic body connecting the inner cylinder and the outer cylinder.

3 Claims, 8 Drawing Sheets

(56) References Cited

U.S. PATENT DOCUMENTS

| | | | |
|---|---|---|---|
| 7,866,640 B2 * | 1/2011 | Funano | B60G 21/052 267/141.4 |
| 2010/0065998 A1 | 3/2010 | Tomida et al. | |
| 2016/0341271 A1 | 11/2016 | Yahata | |

FOREIGN PATENT DOCUMENTS

| | | | | |
|---|---|---|---|---|
| JP | 2007177820 A | * | 7/2007 | ........... B60G 21/052 |
| JP | 2008-249035 | | 10/2008 | |
| JP | 2008256345 A | * | 10/2008 | |
| JP | 2009264568 A | * | 11/2009 | |
| JP | 2016-65594 | | 4/2016 | |
| JP | 2018062976 A | * | 4/2018 | ............ F16F 1/3863 |
| WO | WO-2016047395 A1 | * | 3/2016 | ............ F16F 1/3842 |

* cited by examiner

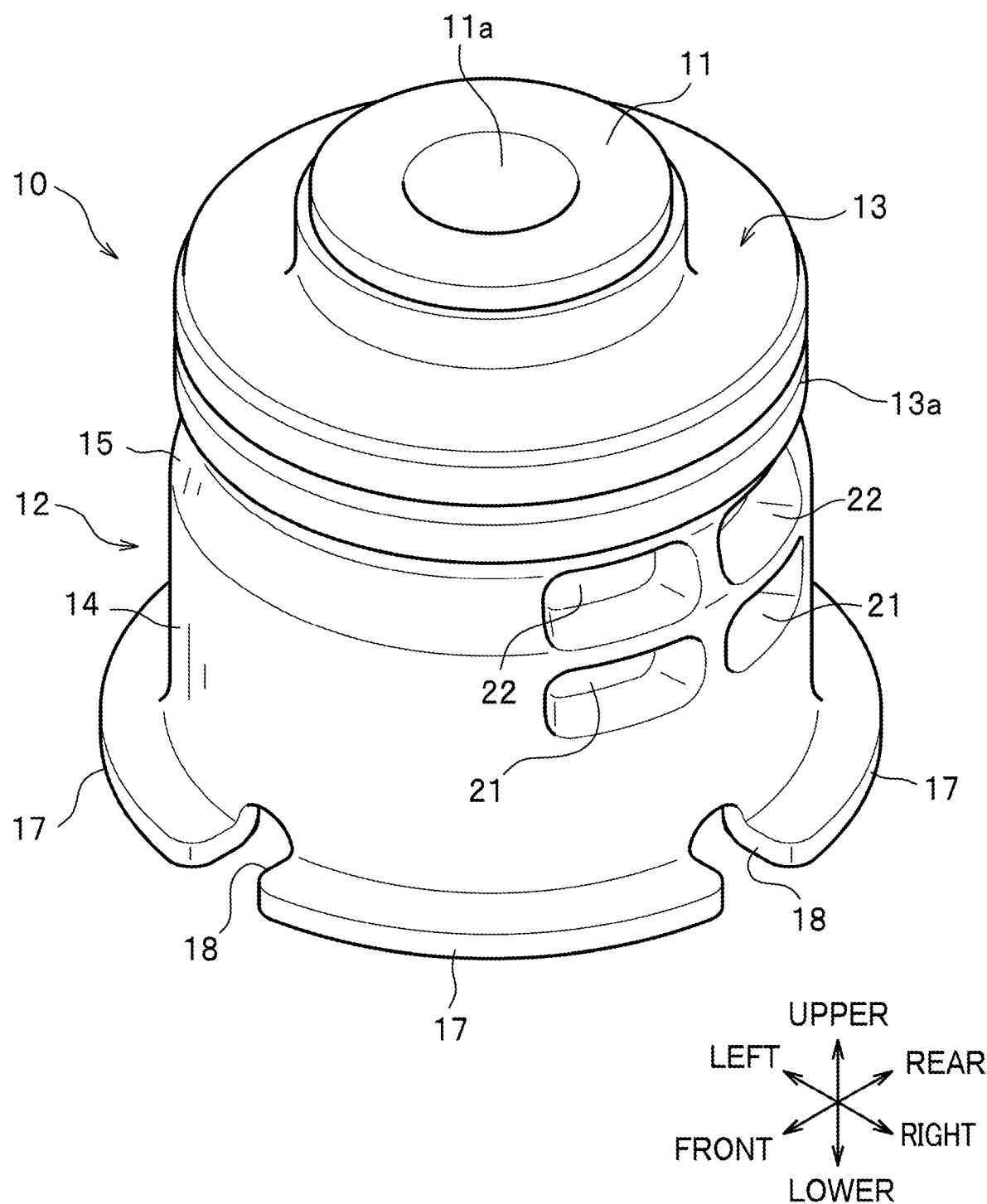

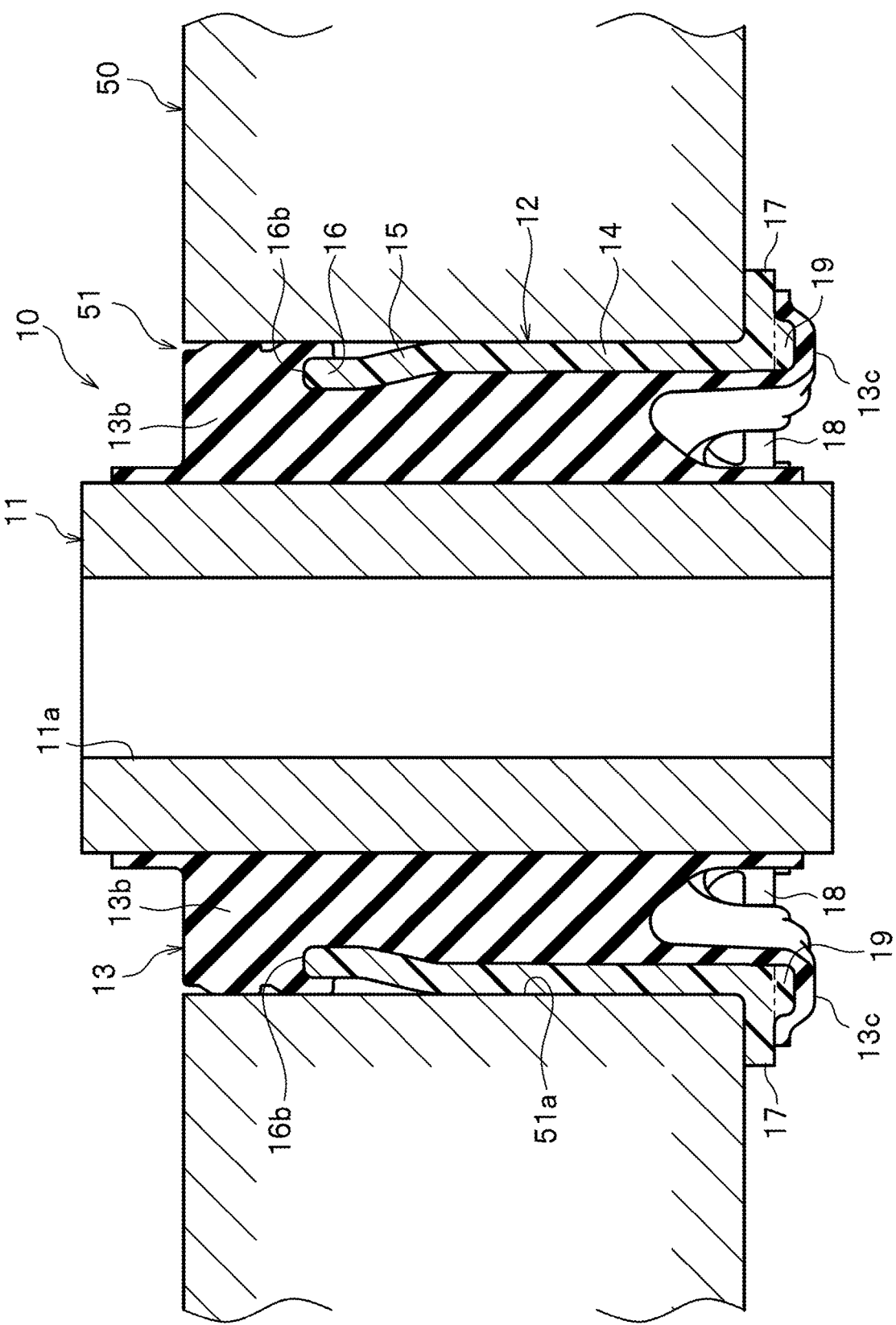

VIBRATION-DAMPING DEVICE

TECHNICAL FIELD

The present invention relates to a vibration-damping device with a rubber elastic body provided between an inner cylinder and an outer cylinder.

BACKGROUND ART

A vibration-damping device incorporated in an engine mount or the like of an automobile has been known as this type of vibration-damping device. This vibration-damping device includes: an inner cylinder; an outer cylinder arranged around the outer circumference of the inner cylinder with a space in between; and a rubber elastic body which elastically connects the inner cylinder and the outer cylinder.

A reduction in the weight of an automobile in recent years has encouraged consideration for the use of resin members in the vibration-damping device. For example, a vibration-damping device disclosed in Patent Literature 1 employs a resin-made outer cylinder.

The vibration-damping device disclosed in Patent Literature 1 includes the cylindrical outer cylinder, and a ring-shaped flange part jutting outward in a radial direction from an end of the outer cylinder. The flange part is formed continuing from the end of the outer cylinder, and having substantially the same thickness as the outer cylinder. In addition, the outer cylinder is assembled with a rubber elastic body and the inner cylinder which are arranged inside the outer cylinder co-axially. The vibration-damping device like this is fitted to an attachment member by being press-fitted into an attachment insertion hole of the attachment member. The vibration-damping device is press-fitted by pressing the flange part of the outer cylinder toward the attachment member using a press fitting jig.

CITATION LIST

Patent Literature

Patent Literature 1: JP 2002-161934 A

SUMMARY OF INVENTION

Technical Problem

Since, however, the flange part in the vibration-damping device disclosed in Patent Literature 1 is formed with the same thickness as the outer cylinder, the pressing of the flange part using the press fitting jig has a risk that the flange part may bend due to reception of load, and break due to stress concentration.

The present invention has been made in order to solve the above problem. An object of the present invention is to provide a vibration-damping device which is capable of favorably inhibiting the flange part and the outer cylinder from breaking in the course of fitting the vibration-damping device to the attachment member.

Solution to Problem

To solve the above problems, a vibration-damping device according to the present invention includes: an inner cylinder; a resin-made outer cylinder arranged outside the inner cylinder in a radial direction; and a rubber elastic body connecting the inner cylinder and the outer cylinder. The outer cylinder includes a press fitted part to be press-fitted into an attachment insertion hole formed in an attachment member. The press fitted part of the outer cylinder includes a flange part jutting outward in the radial direction from an end part of the press fitted part in a direction opposite from a press fitting direction in which the press fitted part is to be press-fitted into the attachment member. A boundary part between the end portion of the press fitted part and the flange part is reinforced with a reinforcement part from outside in an axial direction of the press fitted part.

In the vibration-damping device like this, the boundary part, that is, a part on which load works in the course of press-fitting the vibration-damping device into the attachment insertion hole formed in the attachment member, can be reinforced with the reinforcement part. This makes it possible to favorably inhibit the flange part from collapsing or breaking in the course of press-fitting the vibration-damping device to the attachment member.

Furthermore, in the above-discussed vibration-damping device, the flange part is provided with cut parts. The vibration-damping device like this is capable of favorably inhibiting the flange part and the outer cylinder from breaking by making the cut parts disperse loads applied to the flange part and the outer cylinder during the press fitting.

Moreover, in the above-discussed vibration-damping device, the reinforcement part is divided in the circumferential direction by the cut parts. The vibration-damping device like this is capable of more favorably inhibiting the flange part and the outer cylinder from breaking by making the cut part favorably disperse the loads applied to the flange part and the outer cylinder during the press fitting.

Advantageous Effects of Invention

The present invention makes it possible to obtain the vibration-damping device which is capable of favorably inhibiting the flange part and the outer cylinder from breaking during the fitting to the attachment member.

BRIEF DESCRIPTION OF DRAWINGS

FIG. 1 is a perspective view showing a vibration-damping device according to an embodiment of the present invention;

FIG. 8 is a cross-sectional view showing how the vibration-damping device is fitted to an attachment insertion hole in an attachment member.

DESCRIPTION OF EMBODIMENTS

Figure 2A:
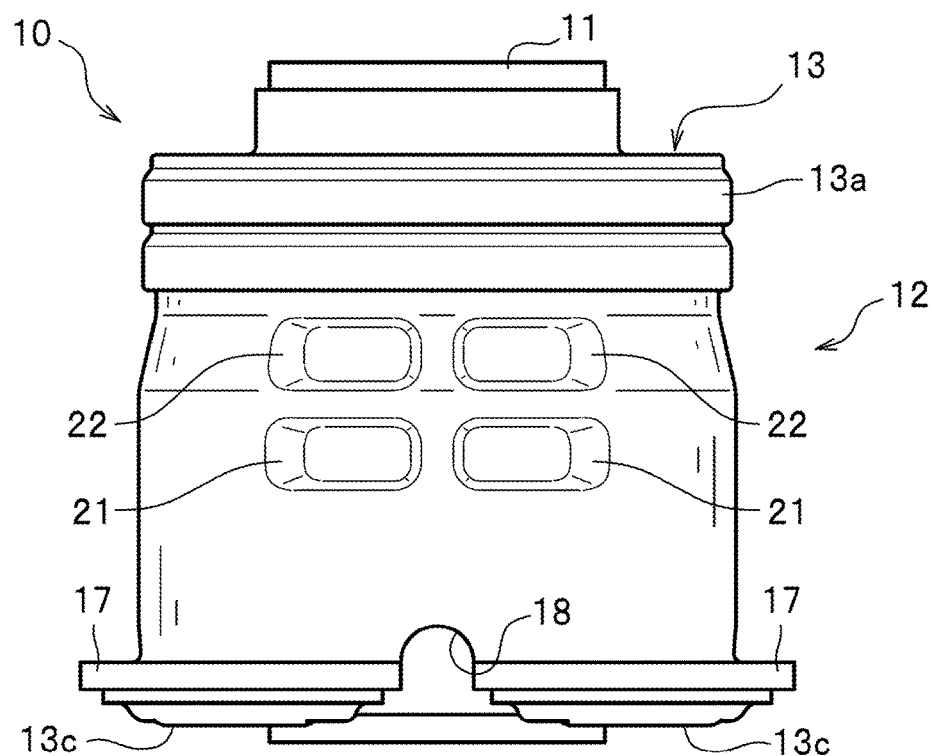
FIG. 2A is a side view of the vibration-damping device.
Figure 2B:
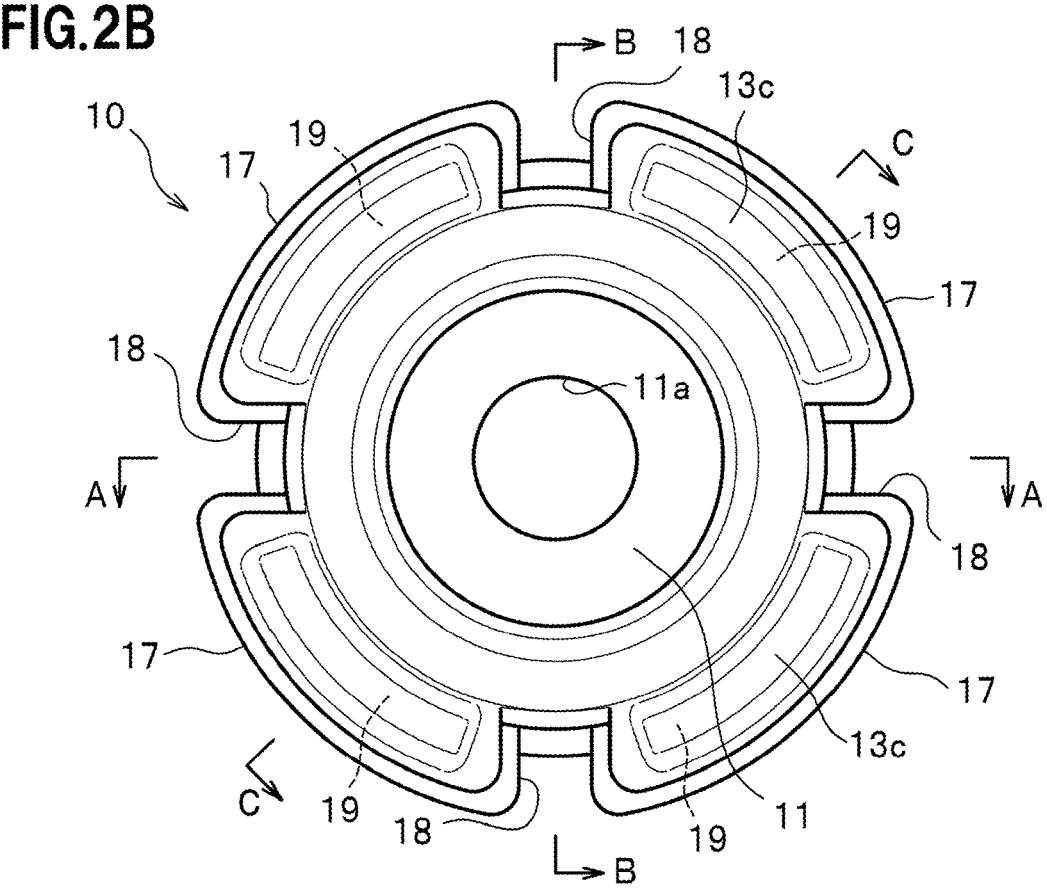
FIG. 2B is a bottom view of the vibration-damping device.

Hereinafter, embodiments of a vibration-damping device according to the present invention will be described with reference to the accompanying drawings depending on the necessity. Incidentally, in the following descriptions, "front," "rear," "upper," "lower," "left" and "right" from the vibration-damping device are based on the directions indicated in FIG. 1. A left-right direction and a front-rear direction vertically intersect each other on the same plane, while an upper-lower direction vertically intersects the left-right direction and the front-rear direction. In this case, the "front-rear" direction of the vibration-damping apparatus does not necessarily coincide with the front-rear direction of a vehicle body of an automobile.

The vibration-damping device 10 according to the embodiment is provided between a vibration source such as an engine (not shown) and a vehicle body such as a frame which are installed in the automobile.

[Schematic Configuration of Vibration-Damping Device]

As shown in FIG. 1, the vibration-damping device 10 includes an inner cylinder 11, an outer cylinder 12, and a rubber elastic body 13. The vibration-damping device 10 is fitted to an attachment insertion hole 51 (see FIG. 8, the same in the below) of an attachment member 50 (a holder, see FIG. 8, and the same in the below), which will be described later.

[Inner Cylinder]

The inner cylinder 11 is a metal-made cylindrical member with a predetermined thickness. The inner cylinder 11 is arranged in a central portion of the vibration-damping device 10. The inner cylinder 11 includes a through-hole 11a formed extending in an axial direction. External dimensions of the inner cylinder 11 are constant from an upper end to a bottom end of the inner cylinder 11 in the axial direction (see FIGS. 3A and 3B). The dimension of the inner cylinder 11 in the axial direction is larger than a dimension of the outer cylinder 12 in the axial direction. As shown in FIG. 2A, two end portions of the inner cylinder 11 jut out from two end portions of the outer cylinder 12. The inner cylinder 11 is fixed to the vehicle body, such as the frame, with a bolt or the like (not shown) which is inserted through the through-hole 11a.

[Schematic Configuration of Outer Cylinder and Configuration of Attachment Member]

Figure 3A:
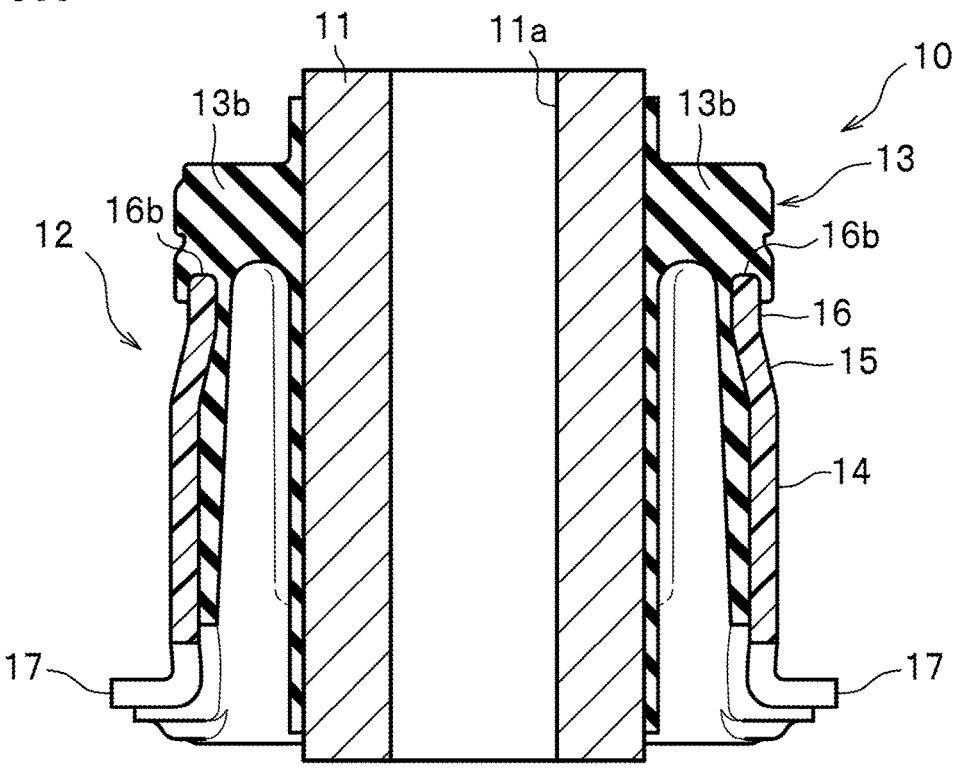
FIG. 3A is a cross-sectional view taken along the A-A line of FIG. 2B.
Figure 4A:
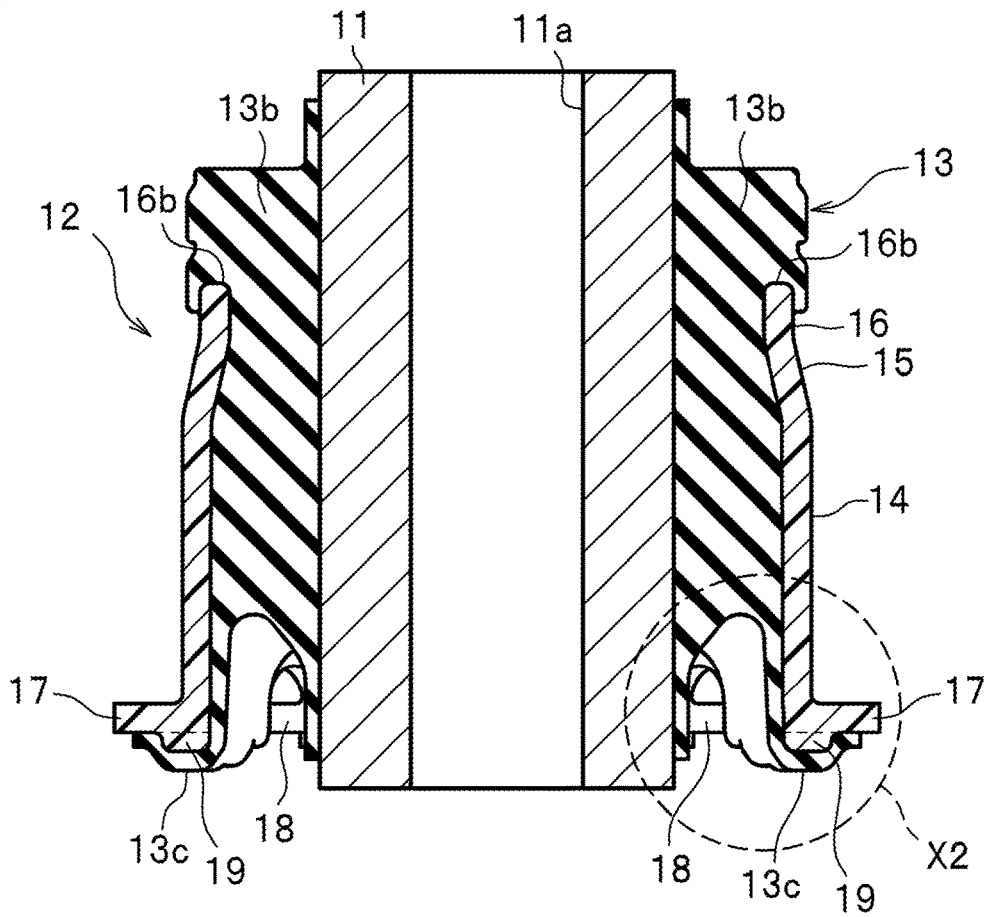
FIG. 4A is a cross-sectional view taken along the C-C line of FIG. 2B.
Figure 4B:
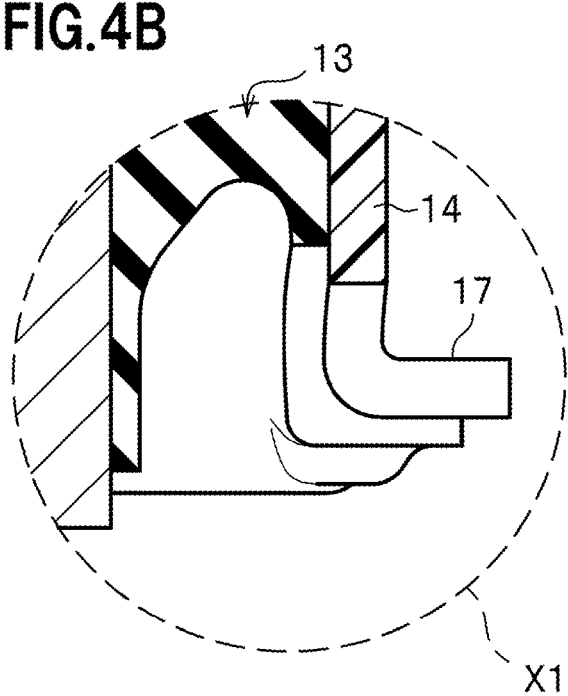
FIG. 4B is a magnified cross-sectional view of an area encircled with a dashed line X1 in FIG. 3B.

The outer cylinder 12 is a resin-made cylindrical member which is thinner than the inner cylinder 11. The outer cylinder 12 is, for example, an injection-molded product formed by injection molding. As shown in FIGS. 3A and 4A, the outer cylinder 12 is arranged outside the inner cylinder 11 in a radial direction with a space in between, and forms an outer shell of the vibration-damping device 10. In other words, the inner cylinder 11 is arranged inside the outer cylinder 12.

Figure 5A:
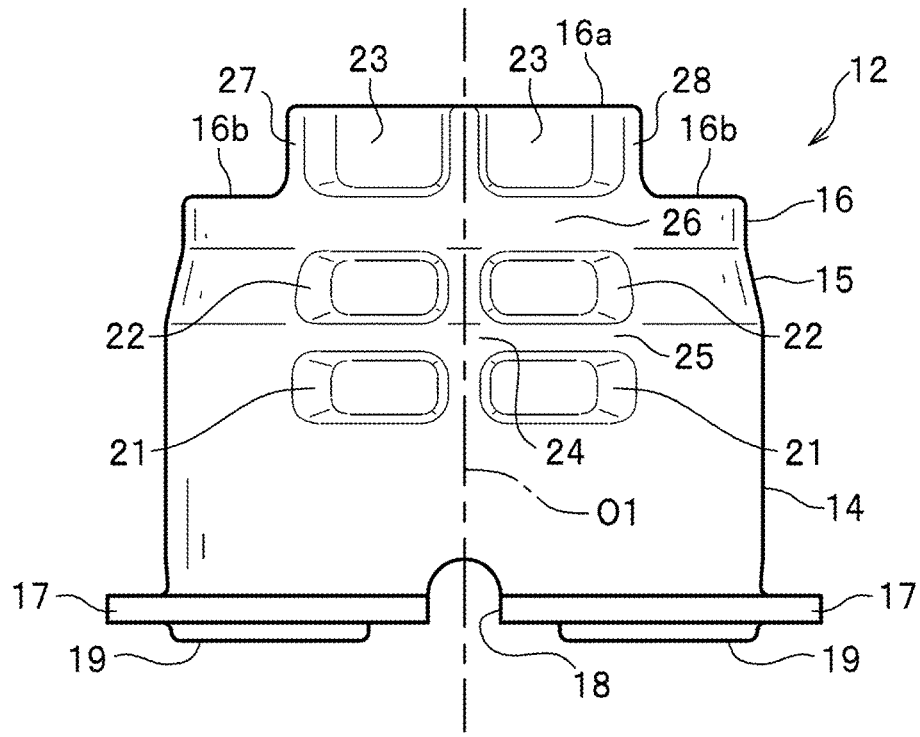
FIG. 5A is a side view of an outer cylinder.
Figure 6A:
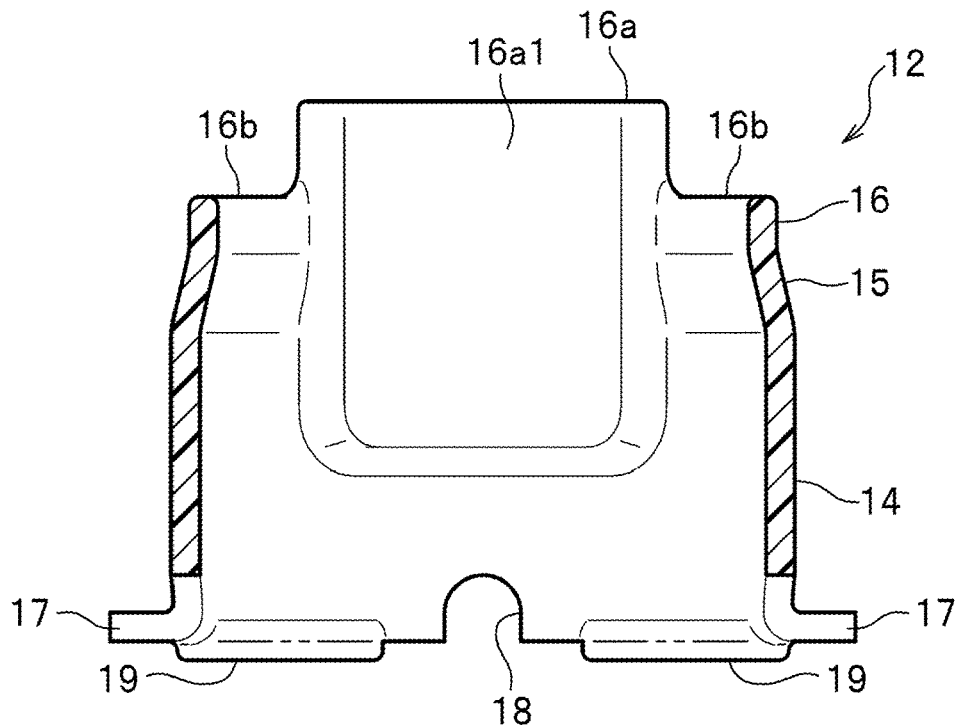
FIG. 6A is a cross-sectional view taken along the D-D line of FIG. 5B.

As shown in FIGS. 5A, 6A, 7A and 7B, the outer cylinder 12 includes: a press fitted part 14; a drawn part 15 continuing from the an upper end of the press fitted part 14; and a cylindrical part 16 continuing from an upper end of the drawn part 15. As shown in FIGS. 5A and 6A, the outer cylinder 12 includes recessed parts 21 to 23 which are set further back in a radial direction of the outer cylinder 12 than the rest of the outer cylinder 12. The recessed parts 21 to 23 are provided in left and right surfaces in an outer peripheral surface of the outer cylinder 12, and extend inward in the radial direction. Multiple recessed parts 21 are provided in the press fitted part 14; multiple recessed parts 22 are provided in the drawn part 15; and the multiple recessed parts 23 are provided in the cylindrical parts 16.

In this respect, as shown in FIG. 8, the attachment member 50 (the holder) includes the attachment insertion hole 51. The attachment insertion hole 51 includes a cylindrical inner surface 51a. The outer cylinder 12 of the vibration-damping device 10 is press-fitted to the inner surface 51a.

[Press fitted Part of Outer Cylinder]

Figure 7A:
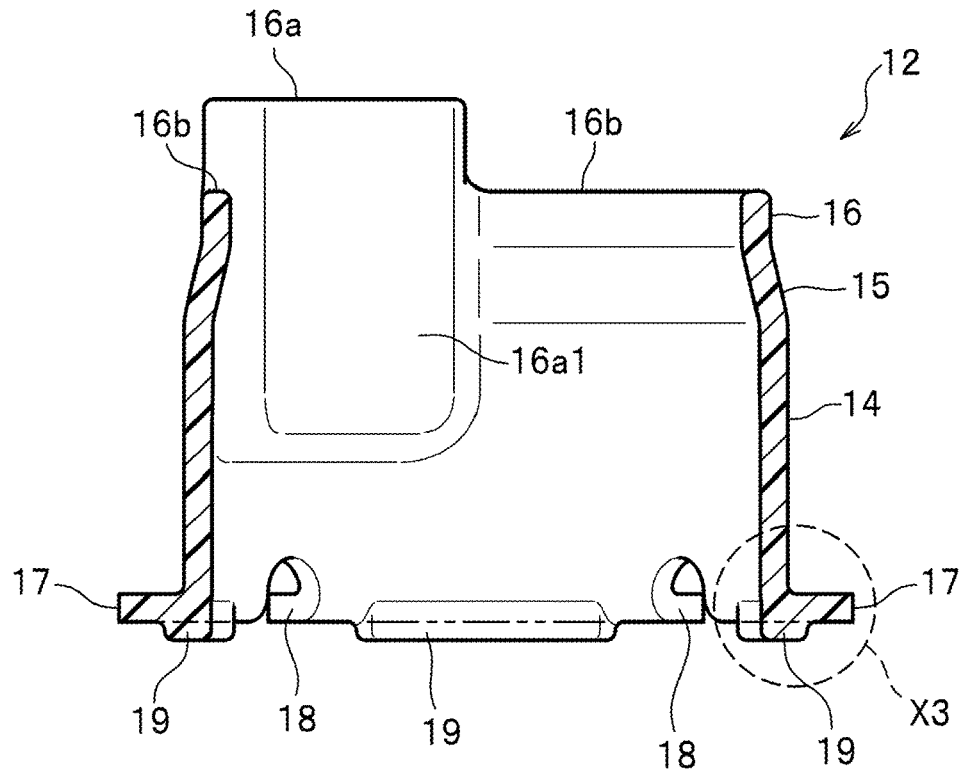
FIG. 7A is a cross-sectional view taken along the F-F line of FIG. 5B.

The press fitted part 14 is a part which is press-fitted into the attachment insertion hole 51 of the attachment member 50 (the holder). The press fitted part 14 is a large-diameter part whose diameter is larger than that of the cylindrical part 16. As shown in FIGS. 6A and 7A, external dimensions of the press fitted part 14 are set constant from an upper end to a bottom end of the press fitted part 14 in the axial direction. As shown in FIGS. 5A and 6A, the drawn part 15 is formed continuing from the upper end of the press fitted part 14. Flange parts 17 are formed integrally on an outer peripheral surface of a lower end portion of the press fitted part 14. The lower end portion of the press fitted part 14 is an end portion in a direction opposite to a press fitting direction in which the press fitted part 14 is press-fitted into the attachment insertion hole 51 of the attachment member 50. The multiple recessed parts 21 are formed in the left and right surfaces in the outer peripheral surface of the press fitted part 14. Details of the recessed parts 21 will be described later.

[Flange Parts of Outer Cylinder]

Figure 5B:
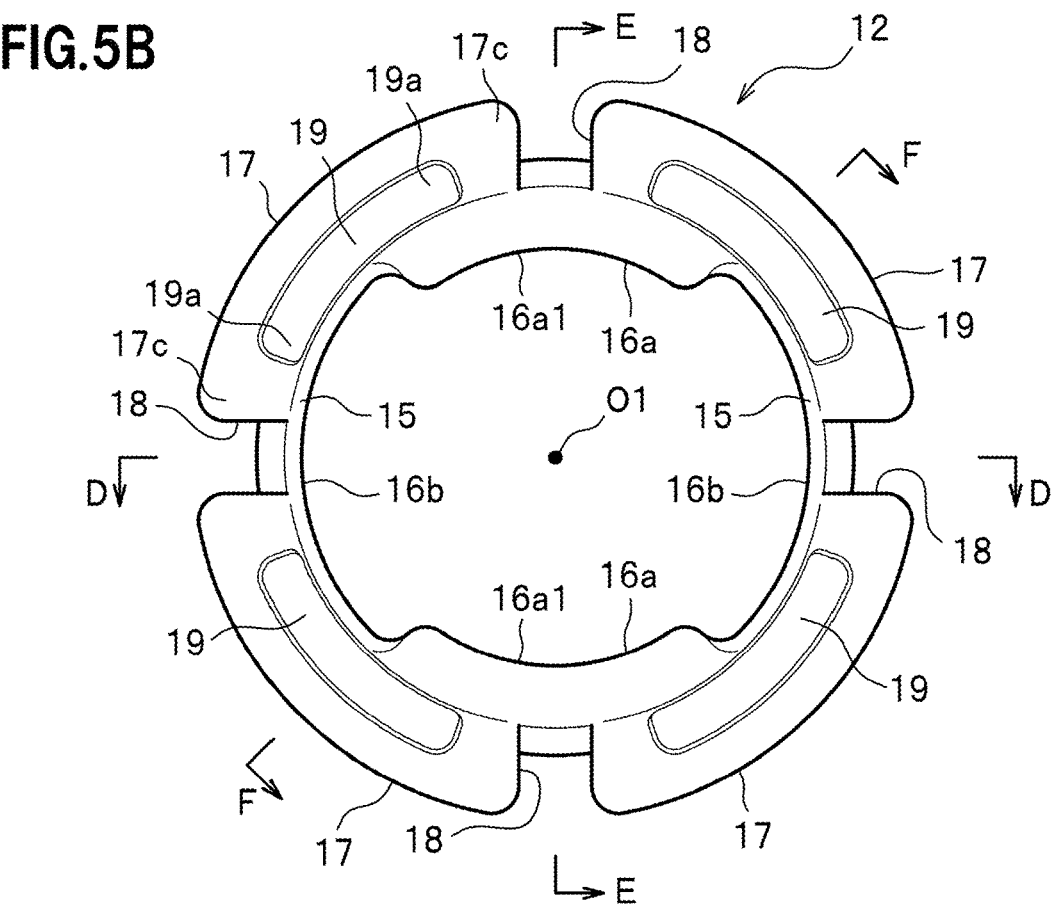
FIG. 5B is a bottom view of the outer cylinder.

As shown in FIG. 5A, the flange parts 17 jut outward in the radial direction from the lower end portion of the press fitted part 14. As shown in FIG. 8, the flange parts 17 are in contact with an opening edge of the attachment insertion hole 51 while the vibration-damping device 10 is fitted to the attachment insertion hole 51 of the attachment member 50 (the holder). As shown in FIGS. 5A and 5B, cut parts 18 are formed between the flange parts 17.

[Cut Parts between Flange Parts in Outer Cylinder]

As shown in FIG. 5B, four cuts parts 18 in total are formed between the flange parts 17 at intervals of 90 degrees in a circumferential direction of the flange. The four cut parts 18 divide the flange into the four flange parts 17 in the circumferential direction. A radial-direction inner portion of each cut part 18 is cut in an upward-facing arc which penetrates into the lower end portion of the press fitted part 14 (see FIG. 5a). In other words, the cut parts 18 are formed extending from the outer peripheral ends of the flange parts 17 to the lower end portion of the press fitted part 14.

As discussed later, in a case where stress occurs in the flange parts 17 during the press fitting into the attachment insertion hole 51 of the attachment member 50 (the holder), the cut parts 18 like this play a role of scattering and attenuating the stress. Furthermore, in the case where stress occurs in the press fitted part 14 during the press fitting into the attachment insertion hole 51 of the attachment member 50 (the holder), the cut parts 18 also play a role of dispersing and attenuating the stress, since the cut parts 18 are formed extending from the outer peripheral ends of the flange parts 17 to the lower end portion of the press fitted part 14.

[Reinforcement Part for Outer Cylinder]

Figure 7B:
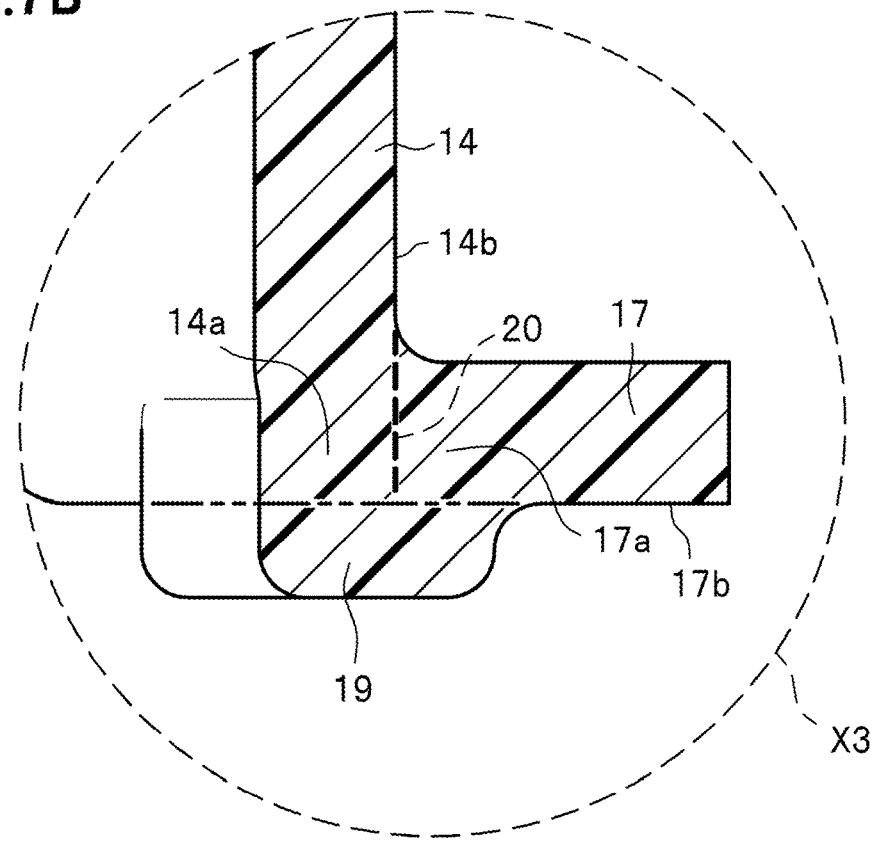
FIG. 7B is a magnified cross-sectional view of an area encircled with a dashed line X3 in FIG. 7A.

As shown in FIG. 7B, a boundary part 20 between the end portion of the press fitted part 14 and the flange part 17 is reinforced with a reinforcement part 19 from outside the press fitted part 14 in the axial direction. In this respect, the boundary part 20 is a part indicated by an imaginary line which is represented with a dashed line in FIG. 7B. The imaginary line represented with the dashed line indicates a surface which is obtained by extending an outer surface 14b of the press fitted part 14 downward in the radial direction. In other words, the surface is a boundary surface between an outer surface of the lower end part 14a of the press fitted part 14 and an end surface of a root part 17a of the flange part 17. Incidentally, in FIG. 7B, an imaginary line represented with a chain double-dashed line indicates a surface which is obtained by extending a lower surface 17b of the flange part 17 inward in the radial direction of the press fitted part 14.

To put it in detail, in FIG. 7B, the reinforcement part 19 is a part which bulges downward beyond the imaginary line represented by the chain double-dashed line, and is formed arranged on and around a part obtained by extending the boundary part 20 downward in the axial direction. In other words, the reinforcement part 19 is a part adjacent to the boundary part 20, and is formed by making the lower end part 14a of the press fitted part 14 and the root part 17a of the flange part 17 thicker downward in the axial direction which means outward in the axial direction of the press fitted part 14. In other words, the reinforcement part 19 is formed extending in the radial direction of the press fitted part 14 from the lower side of the lower end part 14a of the press fitted part 14 to the lower side of the root part 17a of the flange part 17. Incidentally, the reinforcement part 19 is arranged at least under a position where the boundary part 20 crosses the imaginary line represented with the chain double-dotted line.

Thereby, the reinforcement part 19 favorably reinforces the lower end part 14a of the press fitted part 14 and the root part 17a of the flange part 17, which forms the part adjacent to the boundary part 20, from under in the axial direction of the press fitted part 14.

As shown in FIGS. 5A and 5B, each reinforcement part 19 is formed in the shape of a projecting strip which juts downward from the corresponding flange part 17. In other words, the reinforcement parts 19 are separately formed on the respective flange parts 17, and not continuously in the circumferential direction of the flange parts 17. As shown in FIG. 5B, in its bottom view, each reinforcement part 19 extends in the shape of an arc in the same way as the corresponding flange part 17.

Two end parts 19a, 19a of each reinforcement part 19 in the circumferential direction are away from the cut parts 18, 18 which are adjacent to the respective end parts 19a, 19a in the circumferential direction, but not in contact with the cut parts 18, 18. Thus, two end parts 17c, 17c of each flange part 17 in the circumferential direction are areas which are not reinforced with the corresponding reinforcement part 19. Thereby, load which is applied to each flange part 17 during the press fitting is favorably dispersed to the neighboring cut parts 18 via the two end parts 17c, 17c of the flange part 17.

Figure 4C:
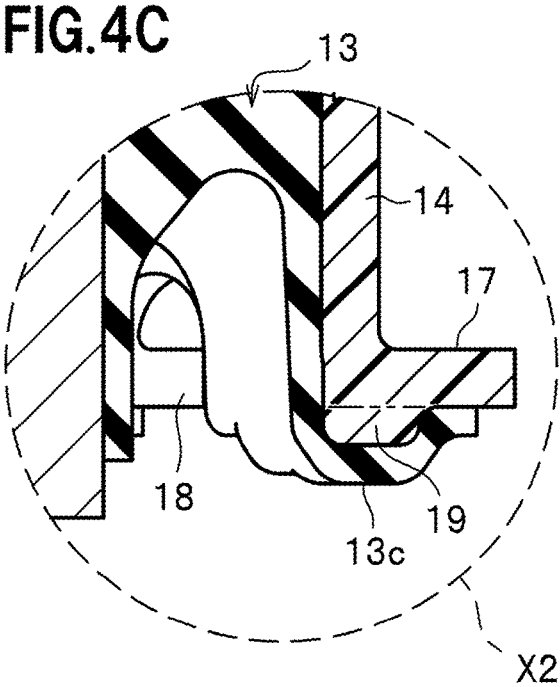
FIG. 4C is a magnified cross-sectional view of an area encircled with a dashed line X2 in FIG. 4A.

As shown in FIGS. 4A and 4C, a lower surface, or an outer surface of each reinforcement part 19 is thinly covered with a lower covering part 13c of the rubber elastic body 13.

[Drawn Part of Outer Cylinder]

As shown in FIG. 5A, the drawn part 15 continues from the press fitted part 14, and is tapered with its diameter becoming smaller. Specifically, the drawn part 15 has a tapered shape which makes the diameter of the drawn part 15 becomes smaller from the upper end portion of the press fitted part 14 and upward toward the lower end portion of the cylindrical part 16. As shown in FIGS. 6A and 7A, an outer surface of the drawn part 15 inclines inward in the radial direction. The cylindrical part 16 is formed continuing from the upper end of the drawn part 15. The multiple recessed parts 22 are formed in the drawn part 15, like the recessed parts 21 formed in the press fitted part 14. Details of the recessed parts 22 will be described later.

[Cylindrical Part of Outer Cylinder]

The cylindrical part 16, which is a small-diameter part, extends to its upper end from the small-diameter end portion of the drawn part 15, and is formed in the shape of a cylinder. A direction in which the cylindrical part 16 extends coincides with the press fitting direction in which the press fitted part 14 is press-fitted to the attachment member 50. An outer diameter of the cylindrical part 16 is smaller than that of the press fitted part 14, and is smaller than an inner diameter of the attachment insertion hole 51 of the attachment member 50 (the holder).

As shown in FIGS. 5A, 6A and the like, the cylindrical part 16 includes: projecting parts 16a formed therein to project in the axial direction of the cylindrical part 16; and recess-shaped parts 16b formed therein to be set back in the radial direction of the cylindrical part 16 relative to the projecting parts 16a.

[Projecting Parts of Cylindrical Part of Outer Cylinder]

A pair of projecting parts 16a are formed facing each other in the radial direction in a front-rear direction of the cylindrical part 16. The projecting parts 16a are each formed wide in a circumferential direction of the cylindrical part 16. The multiple recessed parts 23 are formed in each projecting part 16a, like the recessed parts 21 formed in the press fitted part 14 and the recessed parts 22 formed in the drawn part 15. Details of the recessed parts 23 will be described later.

Figure 3B:
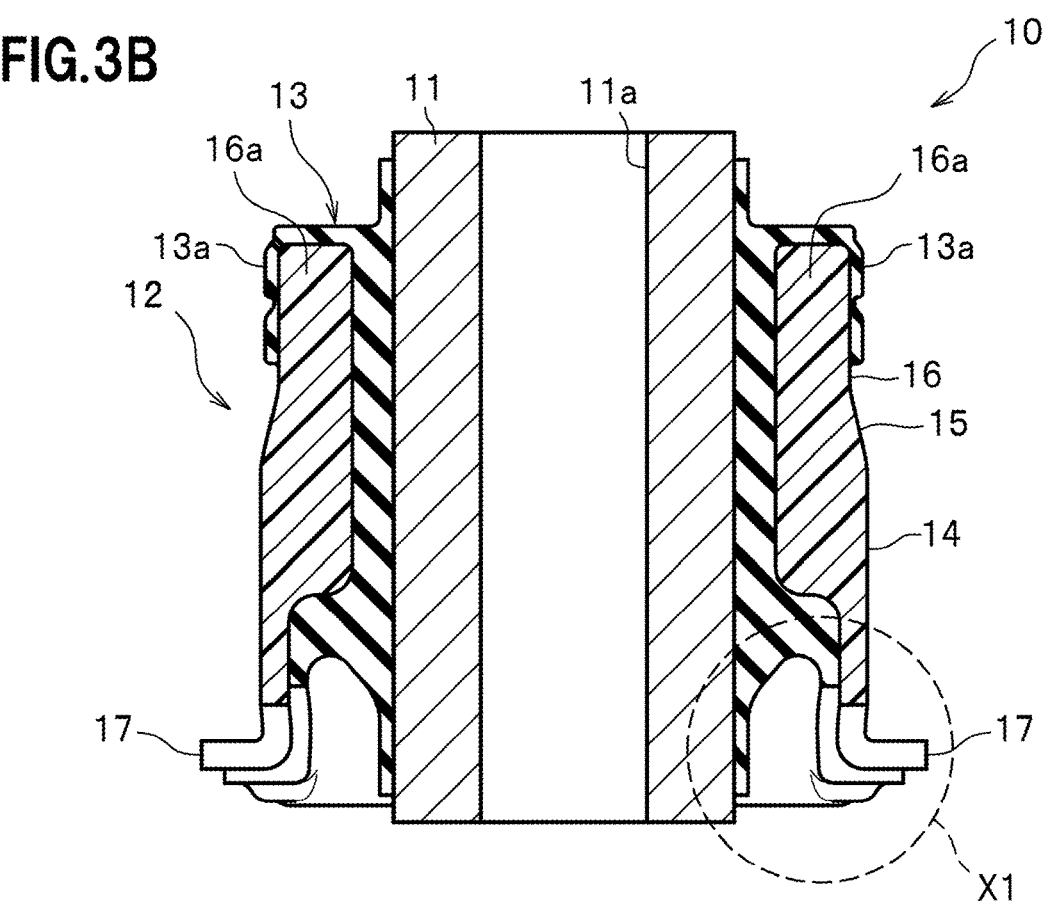
FIG. 3B is a cross-sectional view taken along the B-B line of FIG. 2B.

External dimensions of each projecting part 16a are set constant throughout the full length of the projecting part 16a. As shown in FIG. 3B, an outer surface of each projecting part 16a is thinly covered with an extension part 13a (described later) of the rubber elastic body 13. The projecting part 16a like this is in contact with the inner surface 51a (see FIG. 8) of the attachment insertion hole 51 of the attachment member 50 (the holder) with the rubber elastic body 13 in between.

[Recess-shaped Parts of Cylindrical Part in Outer Cylinder]

Figure 6B:
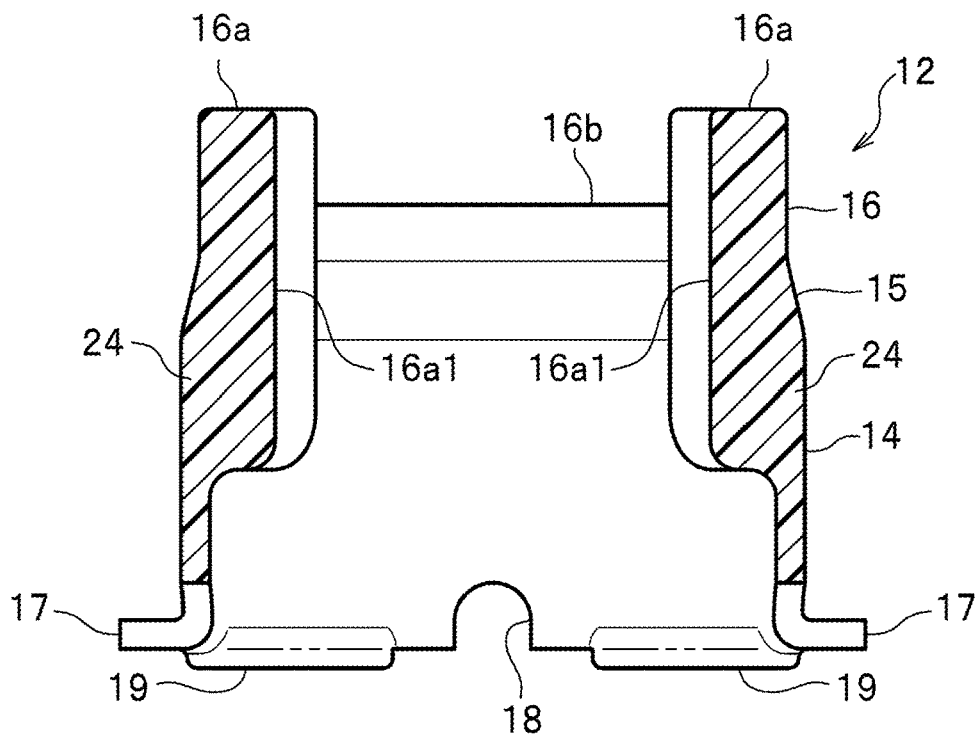
FIG. 6B is a cross-sectional view taken along the E-E line of FIG. 5B.

A pair of recess-shaped parts 16b are formed facing each other in the radial direction in the left-right direction of the cylindrical part 16. The recess-shaped parts 16b, 16b are formed between the projecting parts 16a, 16a in the circumferential direction of the cylindrical part 16. Each recess-shaped part 16b is formed wide in the circumferential direction of the cylindrical part 16, and in a substantially C-shaped cross section, as shown in FIG. 6B. The recess-shaped part 16b functions as a space in which to arrange an upper thick part 13b (described later) of the rubber elastic body 13, as shown in FIGS. 3A and 4A.

[Recessed Parts in Outer Cylinder]

The multiple recessed parts 21 to 23 are provided in the left and right surfaces in the outer peripheral surface of the outer cylinder 12 such that the recessed parts 21, the recessed parts 22 and the recessed parts 23 are arranged, respectively, in the press fitted part 14, the drawn part 15 and the cylindrical part 16 in the upper-lower direction. The recessed parts 21 to 23 are set further back in the radial direction of the outer cylinder 12 than the rest of the outer cylinder 12. The recessed parts 21 to 23 in the left surface in the outer peripheral surface of the outer cylinder 12 have the same structure as the recessed parts 21 to 23 in the right surface therein. The following descriptions will be provided for the recessed parts 21 to 23 in the right surface by referring to FIG. 5A.

The recessed parts 21 are provided in an axial-direction upper portion of the outer peripheral surface of the press fitted part 14 which is closer to the drawn part 15. The recessed parts 22 are arranged above the recessed parts 21, and are provided in the outer peripheral surface of the drawn part 15. Furthermore, the recessed parts 23 are arranged above the recessed part 22, and are provided in the projecting part 16a of the cylindrical part 16. In the right surface view, the recessed parts 21 to 23 are arranged such that the two sides of a center line O1 of the press fitted part 14 are each provided with a set of one recessed part 21, one recessed part 22 and one recessed part 23.

Each recessed part 21 in the press fitted part 14 is formed substantially in the shape of a rectangle whose short sides extend in a direction along the center line O1, and whose long sides extend in a direction orthogonal to the center line O1, when the center line O1 is used as the reference. The recessed part 21 is surrounded by the front, rear, upper and lower surfaces as well as the left surface serving as the bottom surface, and the right surface is opened. The recessed parts 22 in the drawn part 15 have the same structure as the recessed parts 21 in the press fitted part 14, except that the recessed parts 22 are formed in the inclined surface serving as the drawn part 15. Descriptions for the recessed parts 22, therefore, are omitted.

The recessed parts 23 are formed in a predetermined rectangular shape which, depending on the height of the projecting part 16a, is vertically longer than the rectangular shape common to the recessed parts 21, 22. Each recessed part 23 is surround by the front, rear and lower surfaces as well as the left surface serving as the bottom surface, and the right and upper surfaces are opened.

As shown in FIGS. 5B, 6A and 6B, an inner side part 16a1 of the outer cylinder 12 (the cylindrical part 16) which forms the left surfaces serving as the bottom surfaces of the recessed parts 21 to 23 juts out further inward in the radial direction than the other inner side part. Thereby, a depth-direction dimension of the recessed parts 21 to 23 is secured while the thickness of the outer cylinder 12 is made substantially constant.

As shown in FIG. 5A, a vertical rib 24 extending in the upper-lower direction along the center line O1 is formed between the recessed parts 21, between the recessed parts 22, and between the recessed parts 23. Furthermore, a horizontal rib 25 extending in the circumferential direction is formed between the recessed parts 21 and the recessed parts 22. In addition, a horizontal rib 26 extending in the circumferential direction is formed between the recessed parts 22 and the recessed parts 23. Moreover, a front vertical rib 27 and a rear vertical rib 28 are formed, respectively, in the front and rear sides of the group of the recessed parts 23, 23. The forming of the ribs 24 to 28 like this secures strength of the left and right surfaces in the outer peripheral surface of the outer cylinder 12. This secures particularly strength of the projecting parts 16a, 16a which jut out from the cylindrical part 16.

Besides, as shown in FIG. 5A, in the right surface view, one cut part 18 is arranged on a lower extension line of the center line O1. As shown in FIG. 6B, similarly, another cut part 18 is arranged under an intermediate portion between the recess-shaped parts 16b, 16b.

[Rubber Elastic Body]

As shown in FIGS. 3A, 3B and 4A, the rubber elastic body 13 is provided between the inner cylinder 11 and the outer cylinder 12, and elastically connects the inner cylinder 11 and the outer cylinder 12. The rubber elastic body 13 is cured and bonded to the outer peripheral surface of the inner cylinder 11 and the inner peripheral surface of the outer cylinder 12, for example, by: pouring molten rubber into an interstice between the inner cylinder 11 and the outer cylinder 12 set in a mold (not shown); and cooling the rubber. The poured molten rubber is also supplied to the outer surfaces of the projecting parts 16a, 16a of the cylindrical part 16 in the outer cylinder 12. Thus, the outer surfaces of the projecting parts 16a, 16a are covered with the thin extension parts 13a of the rubber elastic body 13. The existence of the projecting parts 16a, 16a makes spring force higher in the direction in which the projecting parts 16a, 16a face each other than in the direction in which the recess-shaped parts 16b, 16b face each other.

The poured molten rubber is further supplied to the pair of recess-shaped parts 16b, 16b of the cylindrical part 16. Thereby, as shown in FIG. 3A, the upper thick parts 13b, 13b where the rubber elastic body 13 is formed thick in the radial direction are formed between the recess-shaped parts 16b, 16b and the outer peripheral surface of the inner cylinder 11. Since the upper thick parts 13b, 13b are formed thick, the upper thick parts 13b, 13b are suitable to absorb relatively large vibration.

[Fitting of Vibration-damping Device to Attachment Member]

When the vibration-damping device 10 is going to be fitted to the attachment member 50 (the holder), the cylindrical part 16, one end of the outer cylinder 12 of the vibration-damping device 10 is made to face the insertion port of the attachment insertion hole 51 of the attachment member 50 (the holder), and the vibration-damping device 10 is brought closer to the insertion port.

Thereafter, the cylindrical part 16 of the outer cylinder 12 is inserted into the attachment insertion hole 51 through the insertion port, and the reinforcement parts 19 of the outer cylinder 12 are pressed using a press fitting jig (not shown) with the lower covering parts 13c in between. Thereby, the press fitted part 14 enters the attachment insertion hole 51, and the press fitted part 14 is press-fitted to the inner surface of the attachment insertion part 51 (see FIG. 8). In other words, the vibration-damping device 10 is fixed to the attachment member 50 (the holder) while producing force which presses the outer cylinder 12 inward in the radial direction.

It should be noted that while the vibration-damping device 10 is fixed to the attachment insertion hole 51, the extension part 13a of the rubber elastic body 13 covering the projecting parts 16a of the cylinder part 16 of the outer cylinder 12 is in contact with the inner surface of the attachment insertion hole 51 of the attachment member 50 (the holder). Thereby, the attachment insertion hole 51 is securely sealed with the outer cylinder 12.

It is preferable that the fitting of the vibration-damping device 10 to the attachment member 50 be done, for example, with the recess-shaped parts 16b, 16b facing each other in the front-rear direction of the vehicle body of the automobile, and concurrently with the projecting parts 16a, 16a facing each other in the left-right direction of the vehicle body. Because of the fitting like this, the upper thick parts 13b, 13b of the rubber elastic body 13 which are arranged on the recess-shaped parts 16b, 16b are capable of favorably absorbing large vibration which is inputted when the automobile accelerates and decelerates. In addition, the rubber elastic body 13 whose spring force is increased by the existence of the projecting parts 16a, 16a is capable of favorably absorbing vibration which works in the left-right direction of the vehicle body.

In the above-discussed vibration-damping device 10 according to the embodiment, the reinforcement parts 19 are provided, respectively, on the boundary parts 20 between the lower end part 14a of the press fitted part 14 and the root parts 17a of the flange parts 17. This configuration makes it possible to reinforce the boundary parts 20, that is, parts on which load works in the course of press-fitting the vibration-damping device 10 into the attachment member 50. This makes it possible to favorably inhibit the flange parts 17 from collapsing or breaking in the course of press-fitting the vibration-damping device 10 to the attachment member 50.

Furthermore, in the vibration-damping device 10 according to the embodiment, the cut parts 18 are provided between the flange parts 17. This makes it possible to favorably inhibit the flange parts 17 and the outer cylinder 12 from breaking by making the cut parts 18 disperse loads applied to the flange parts 17 and the outer cylinder 12 during the press fitting.

Moreover, in the vibration-damping device 10 according to the embodiment, the reinforcement parts 19 are separated by the cut parts 18 in the circumferential direction. This makes it possible to more favorably inhibit the flange parts 17 and the outer cylinder 12 from breaking by making the cut parts 18 favorably disperse the loads applied to the flange parts 17 and the outer cylinder 12 during the press fitting.

Although the foregoing descriptions have been provided for the embodiment of the present invention, the present invention is not limited to the embodiment, and can be modified variously.

Although the foregoing embodiment shows the reinforcement parts 19 which are each formed in the shape of a projecting strip, the reinforcement parts 19 are not limited to those thus formed. On each flange part 17, the corresponding reinforcement part 19 may be divided into multiple pieces in the circumferential direction. Various forms and shapes may be employed for the reinforcement parts 19.

In addition, the shape of the cut parts 18, and the number of cut parts 18 may be set on an as-needed basis.

Moreover, the application of the present invention is not limited to the application to the cylinder-shaped vibration-damping device 10. The present invention is applicable to square tube-shaped, oval cylinder-shaped, and various cylinder-shaped vibration-damping devices.

REFERENCE SIGNS LIST

10: vibration-damping device
11: inner cylinder
12: outer cylinder
13: rubber elastic body
14: press fitted part
17: flange part
18: cut part
19: reinforcement part
20: boundary part
50: attachment member (holder)
51: attachment insertion hole

The invention claimed is:

1. A vibration-damping device comprising:
an inner cylinder;
a resin-made outer cylinder arranged outside the inner cylinder in a radial direction; and
a rubber elastic body connecting the inner cylinder and the outer cylinder, wherein
the outer cylinder includes a press fitted part to be press-fitted into an attachment insertion hole formed in an attachment member,
the press fitted part of the outer cylinder includes a flange part jutting outward in the radial direction from an end part of the press fitted part in a direction opposite from a press fitting direction in which the press fitted part is to be press-fitted into the attachment member,
a boundary part between the end part of the press fitted part and the flange part is reinforced with a reinforcement part, which is formed integrally with the outer cylinder, from outside in an axial direction of the press fitted part, and
the reinforcement part bulges downward at a part obtained by extending the boundary part downward in the axial direction.

2. The vibration-damping device according to claim 1, wherein the flange part is provided with cut parts.

3. The vibration-damping device according to claim 2, wherein the reinforcement part is divided into pieces in a circumferential direction by the cut parts.

* * * * *